US007265655B2

(12) United States Patent
Drader et al.

(10) Patent No.: US 7,265,655 B2
(45) Date of Patent: Sep. 4, 2007

(54) HANDHELD COMPUTING DEVICE WITH POWER-SAVING NOTIFICATION

(75) Inventors: Marc A Drader, Kitchener (CA); David James Mak-Fan, Waterloo (CA); Dusan Veselic, Oakville (CA)

(73) Assignee: Research In Motion Ltd., Waterloo, ON ( * ) Notice: Subject to any disclaimer, the term of this patent is extended or adjusted under 35 U.S.C. 154(b) by 71 days.

(21) Appl. No.: 10/857,965

(22) Filed: Jun. 2, 2004

(65) Prior Publication Data
US 2005/0270169 A1    Dec. 8, 2005

(51) Int. Cl.
*G10K 1/08*    (2006.01)
(52) U.S. Cl. ............. 340/392.3; 340/7.61; 340/7.62; 340/309.3; 340/309.4; 340/384.1; 340/384.7; 455/567
(58) Field of Classification Search ............ 340/393.4, 340/309.3, 309.4, 309.7, 309.8, 309.16, 573.1, 340/573.4, 7.58, 815.4, 7.51, 7.61, 392.3, 340/384.1, 384.7, 815.65, 815.46, 7.62; 455/555.1, 455/550.1, 566, 567; 368/28, 29, 82–84; 379/162; 315/132, 133; 446/175
See application file for complete search history.

(56) References Cited

U.S. PATENT DOCUMENTS

| | | | |
|---|---|---|---|
| 4,755,816 A |   | 7/1988 | DeLuca |
| 5,402,702 A | * | 4/1995 | Hata .................. 84/464 R |
| 5,764,597 A | * | 6/1998 | Shih ..................... 368/29 |
| 6,166,652 A | * | 12/2000 | Benvenuti ......... 340/825.49 |
| 6,198,407 B1 | * | 3/2001 | Koga .................... 340/7.58 |
| 6,438,392 B1 | * | 8/2002 | Toba .................... 455/567 |
| 6,807,433 B2 | * | 10/2004 | Oota et al. ............. 455/566 |
| 6,895,239 B2 | * | 5/2005 | Oomori et al. ......... 455/415 |
| 7,102,070 B2 | * | 9/2006 | Muraki .................. 84/609 |
| 2002/0061772 A1 |   | 5/2002 | Hayashi |

FOREIGN PATENT DOCUMENTS

JP    11275182    10/1999

* cited by examiner

*Primary Examiner*—Davetta W. Goins
(74) *Attorney, Agent, or Firm*—Heenan Blaikie LLP

(57) ABSTRACT

A handheld computing device includes a notification lamp, a melody circuit coupled to the notification lamp for providing a first type notification, an electronic switch coupled to the notification lamp for providing a second type notification, and a notification controller coupled to the melody circuit and the electronic switch for selecting between the notification types. The power consumption of the second type notification is less than that of the first type notification.

19 Claims, 3 Drawing Sheets

HANDHELD COMPUTING DEVICE WITH POWER-SAVING NOTIFICATION

FIELD OF THE INVENTION

The invention described herein relates to a handheld computing device. In particular, the invention described herein relates to a power-saving notification circuit for a handheld computing device.

BACKGROUND OF THE INVENTION

The conventional handheld computing device, such as a PDA, or a wireless telephone, may include an electronic calendar and/or task manager through which the user can keep track of appointments and/or to-do items. The handheld computing device may also include a monochrome notification LED which flashes when the date/time of one of the appointments and/or to-do items is imminent. Further, the notification LED may be used to signify that the handheld computing device is being charged.

More recent handheld computing devices may include a melody integrated circuit. The melody integrated circuit is user-programmable, and plays a user-selected melody when the date/time of one of the appointments and/or to-do items is imminent. If the handheld computing device is wireless-enabled, the melody integrated circuit may also play a user-selected melody when the handheld computing device receives an e-mail or a telephone call.

The melody integrated circuit is advantageous, since it allows the user to define a distinct notification (melody) for each notification event (eg. appointment, to-do item, e-mail, telephone call). However, the power consumption of the melody integrated circuit is significantly greater than the monochrome notification LED.

Therefore, there is a need for a lower power notification circuit for a handheld computing device that allows the user to define a distinct notification for each notification event.

SUMMARY OF THE INVENTION

According to one aspect of the invention described herein, there is provided a handheld computing device that includes a notification lamp, a melody circuit coupled to the notification lamp for providing a first type notification, an electronic switch coupled to the notification lamp for providing a second type notification, and a notification controller coupled to the melody circuit and the electronic switch for selecting between the notification types. The power consumption of the second type notification is less than that of the first type notification.

According to another aspect of the invention described herein, there is provided a notification circuit for a handheld computing device, that includes a notification lamp, a melody circuit coupled to the notification lamp for providing a first type notification, and an electronic switch coupled to the notification lamp for providing a second type notification. The power-consumption of the second type notification is less than that of the first type notification.

In one implementation, the notification lamp is a multi-colour lamp, and comprises a plurality of monochrome lamps. The melody circuit includes a number of lamp driver outputs, each being coupled to a respective one of the monochrome lamps. The electronic switch is coupled to one of the monochrome lamps.

The notification controller is configured with a number of notification modes. In a first of the notification modes, the notification controller maintains the melody circuit in a low-power state, and maintains the electronic switch open.

In a second of the notification modes, the notification controller maintains the melody circuit in the low-power state, and closes the electronic switch. In the second notification mode, preferably the notification controller is configured to periodically open and close the electronic switch.

In a third of the notification modes, the notification controller maintains the electronic switch open, and enables the melody circuit.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
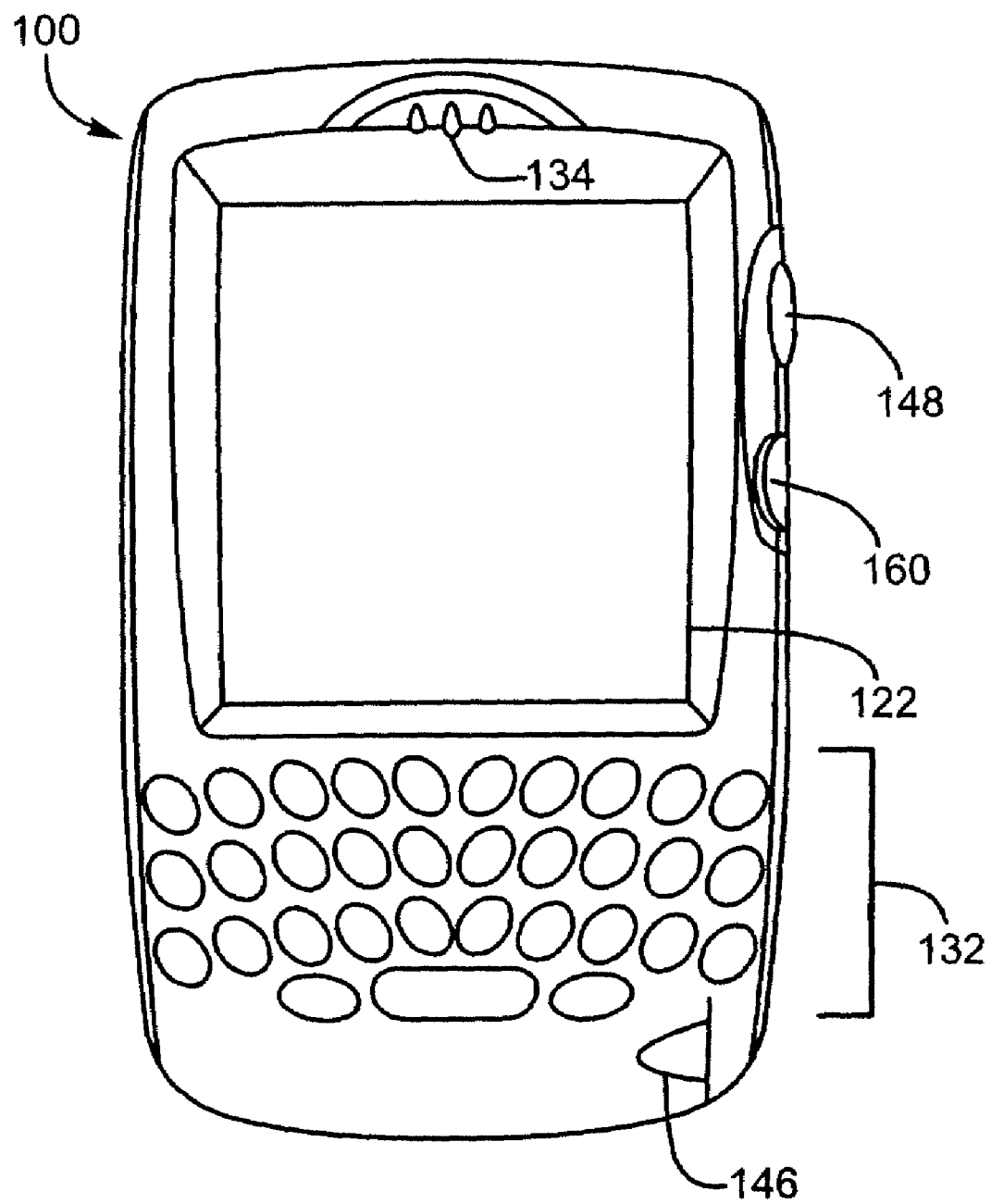
FIG. 1 is a front plan view of a handheld computing device, according the invention described herein.

Referring now to FIG. 1, there is shown a handheld computing device, denoted generally as 100, provided according to one aspect of the invention. The handheld computing device 100 includes a display 122, a function key 146 and a system motherboard (not shown) disposed within a common housing. The display 122 is a self-contained peripheral device that is connected to the system motherboard.

The function key 146 functions as a power on/off switch for the handheld computing device 100, and may also function as a backlight key for the display 122.

In addition to the display 122 and the function key 146, the handheld computing device 100 includes a notification lamp 104, and user data input means for inputting data to the data processing means. As shown, preferably the user data input means includes a keyboard 132, a thumbwheel 148 and an escape key 160.

Typically, the handheld computing device 100 is a two-way wireless communication device having at least voice and data communication capabilities. Further, preferably the handheld computing device 100 has the capability to communicate with other computer systems on the Internet. Depending on the exact functionality provided, the wireless handheld computing device 100 may be referred to as a data messaging device, a two-way pager, a wireless e-mail device, a cellular telephone with data messaging capabilities, a wireless Internet appliance, or a data communication device, as examples.

Figure 2:
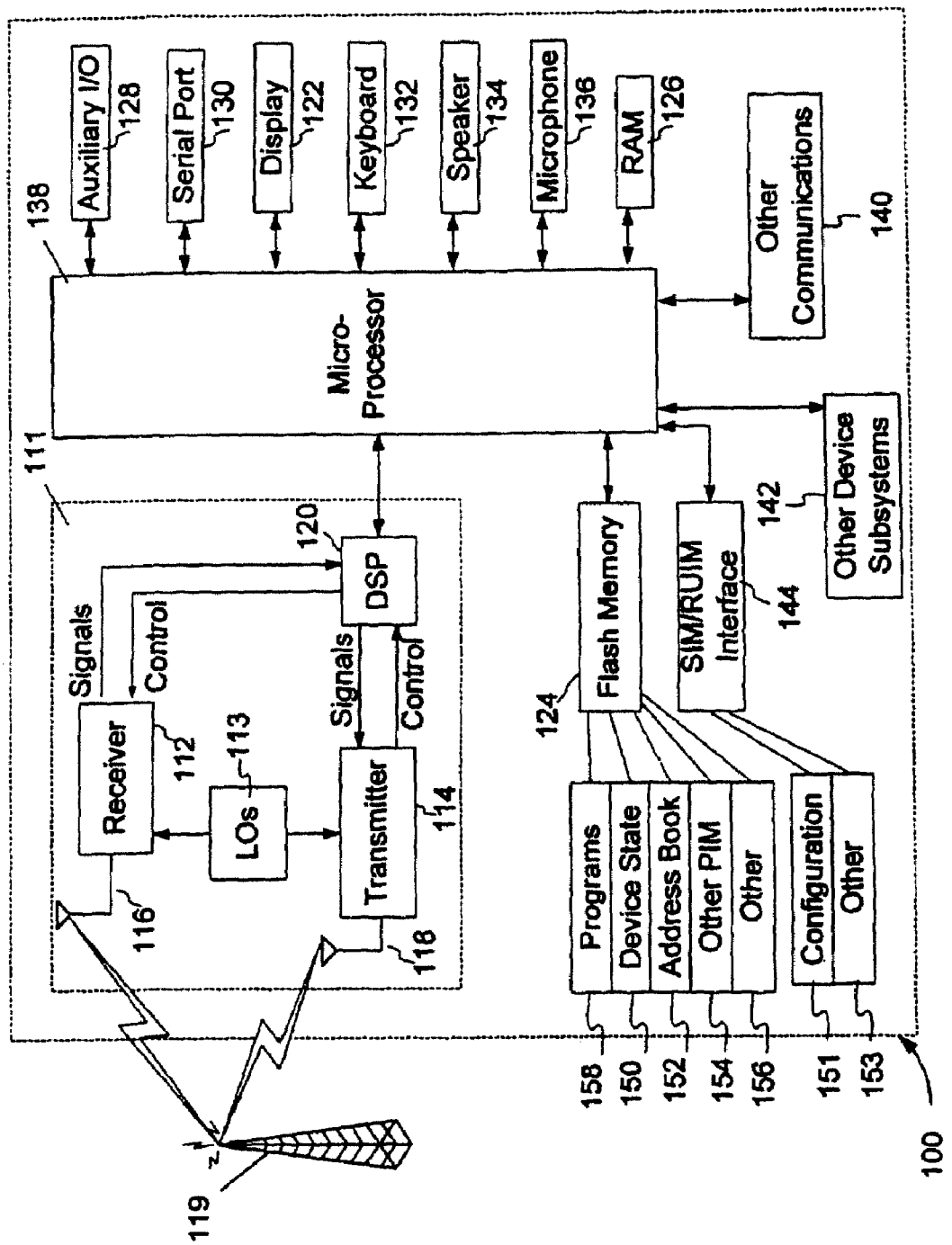
FIG. 2 is a schematic view depicting functional details of the handheld computing device.

FIG. 2 depicts functional details of the handheld computing device 100. Where the handheld computing device 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the handheld computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, the handheld computing device 100 is registered on the network using a unique identification number associated with each handheld computing device. In UMTS and GPRS networks, and in some CDMA networks, however, network access is associated with a subscriber or user of the handheld computing device 100. A GPRS handheld computing device therefore requires a subscriber identity module (SIM) card in order to operate on a GPRS network, and a RUIM in order to operate on some CDMA networks. Without a valid SIM/RUIM card, a GPRS/UMTS/CDMA handheld computing device may not be fully functional. Local or non-network communication functions, as well as legally required functions (if any) such as "911" emergency calling, may be available, but the handheld computing device 100 will be unable to carry out any other functions involving communications over the network. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation methods have been completed, the handheld computing device 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The handheld computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 2 perform communication-related functions, whereas other subsystems may provide "resident" or on-device functions. Some subsystems, such as keyboard 132 and display 122, for example, may be used for both communication-related functions, such as entering a text message for transmission over a communication network, and device-resident functions such as a calculator or task list.

Another such subsystem comprises an event notification subsystem 142 that notifies the user of the handheld computing device 100 of the occurrence of a notification event (eg. appointment, to-do item, e-mail, telephone call) The notification subsystem 142 will be described in detail below.

Operating system software used by the microprocessor 138 is preferably stored in a persistent store such as flash memory 124, which may instead be a read-only memory (ROM) or similar storage element (not shown). Those skilled in the art will appreciate that the operating system specific device applications, or parts thereof, may be temporarily loaded into a volatile memory such as RAM 126. Received communication signals may also be stored in RAM 126.

As shown, the flash memory 124 can be segregated into different areas for both computer programs 158 and program data storage 150, 152, 154 and 156. These different storage areas indicate that each program can allocate a portion of flash memory 124 for their own data storage requirements. In addition to its operating system functions, preferably the microprocessor 138 enables execution of software applications on the handheld computing device. A predetermined set of applications that control basic operations, will normally be installed on the handheld computing device 100 during manufacturing.

One set of basic software applications might perform data and/or voice communication functions, for example. Another set of basic software applications comprises computer processing instructions which, when accessed from the flash memory 124 and/or the RAM 126 and executed by the microprocessor 138, define a notification controller 102. The notification controller 102 interacts with the aforementioned event notification subsystem 142, and selects between the different notification types offered by the notification subsystem 142. The notification controller 102 will be described in detail below.

A preferred software application may be a personal information manager (PIM) application having the ability to organize and manage data items relating to the user of the handheld computing device such as, but not limited to, e-mail, calendar events, voice mails, appointments, and task items. Naturally, one or more memory stores would be available on the handheld computing device to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the user's corresponding data items stored or associated with a host computer system. Further applications may also be loaded onto the handheld computing device 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the handheld computing device 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the handheld computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the handheld computing device 100 is similar, except that received signals would preferably be output to a speaker 134 and signals for transmission would be generated by a microphone 136. Alternative voice or audio I/O subsystems, such as a voice message recording subsystem, may also be implemented on the handheld computing device 100. Although voice or audio signal output is preferably accomplished primarily through the speaker 134, display 122 may also be used to provide an indication of the identity of a calling party, the duration of a voice call, or other voice call related information for example.

Serial port 130 in FIG. 2, would normally be implemented in a personal digital assistant (PDA)-type handheld computing device for which synchronization with a user's desktop computer (not shown) may be desirable. The serial port 130 enables a user to set preferences through an external device or software application and would extend the capabilities of the handheld computing device 100 by providing for information or software downloads to the handheld computing device 100 other than through a wireless communication network Other communications subsystems 140, such as a short-range communications subsystem, is a further optional component which may provide for communication between the handheld computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 3:
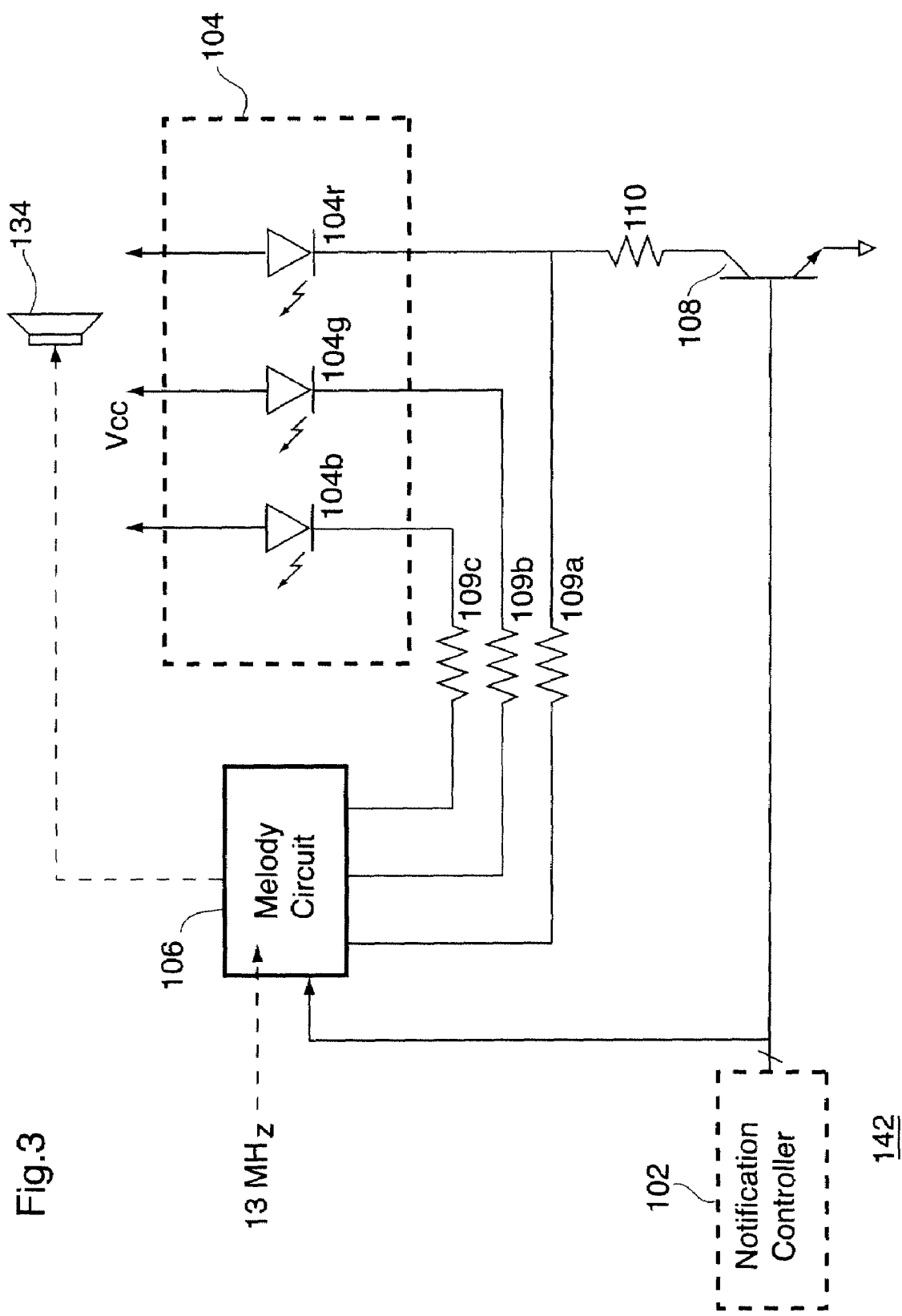
FIG. 3 is a schematic view of the event notification subsystem of the handheld computing device.

FIG. 3 depicts the aforementioned event notification subsystem 142. As shown, the event notification subsystem 142 comprises the notification lamp 104, a melody circuit 106 coupled to the notification lamp 104, and an electronic switch 108 coupled to the notification lamp 104. Preferably, the melody circuit 106 include an audio output in communication with the subsystem that drives the speaker 134.

Further, typically the notification lamp 104 is a tri-colour lamp that comprises three monochrome LEDs. Preferably, the notification lamp 104 includes a red LED 104r, a green LED 104g, and a blue LED 104b that are disposed within a common housing, and are enclosed by a common transparent lens. However, it should be understood that the notification lamp 104 is not so limited by may comprise any number of coloured lamps, and/or colours of lamps. For instance, the notification lamp 104 may comprise one or more differently-coloured monochrome lamps. The notification lamp 104 may also comprise a number of similarly-coloured lamps, each having a respective illumination intensity. Variations on the foregoing will be apparent and are intended to be encompassed by the invention, as defined by the appended claims.

The melody circuit 106 is an integrated circuit that is mounted on the motherboard of the handheld computing device 100. Preferably, the melody circuit 106 is user-programmable with one or more tunes that can be played through the speaker 134 in response to the notification event associated with the tune. Typically, the user downloads tunes to the handheld computing device 100, over the serial port 130 or the wireless communication network. A suitable melody circuit 106 is OKI ML2870A.

The melody circuit 106 has a tune select input through which the melody circuit 106 is notified of the tune to play. The melody circuit 106 also includes a number of lamp driver outputs, each coupled to a respective one of the monochrome LEDs 104r, 104g, 104b through a respective current-limiting resistor 109a, 109b, 109c. The lamp driver outputs allow the melody circuit 106 to turn the monochrome LEDs 104r, 104g, 104b on and off.

Typically, the melody circuit 106 flashes the LEDs 104r, 104g, 104b in synchronization to the melody being played through the speaker 134. Alternately, the melody circuit 106 may be programmed to vary the duty cycle of the on/off interval for each of the LEDs 104r, 104g, 104r, so that the colour of the multicolour lamp 104 varies in synchronization to the melody.

The notification subsystem 142 also includes a current-limiting resistor 110, connected in series with one of the three monochrome LEDs. In the example shown, the current-limiting resistor 110 is connected in series with the red LED 104r, but is in parallel with the current-limit resistors 109r and the corresponding lamp driver output of the melody circuit 106.

Preferably, the electronic switch 108 comprises a transistor having a drain/source terminal that is coupled to the red LED 104r through the current-limiting resistor 110. The electronic switch 108 includes a gate/base input which is used to turn the electronic switch 108 on and off. Typically, the electronic switch 108 will periodically flash the monochrome LED 104r. Alternately, the electronic switch 108 may maintain the monochrome LED 104r continuously on.

It should be understood that the current-limiting resistor 110 and the electronic switch 108 need not be connected to the red LED 104r, but can be connected to any of the monochrome LEDs 104. For instance, if it is desirable to notify the user of an active Bluetooth connection, the current limiting resistor 100 and the electronic switch 108 could be connected to the blue LED 104b. Further, the notification subsystem 142 is not limited to having only one electronic switch 108, but instead could include a separate electronic switch for each lamp of the notification lamp 104.

The melody circuit 106 requires a high frequency clock (approximately 13 MHz), which causes the melody circuit 106, when active, to consume significantly more power than the electronic switch 108. Further, the resistance of the current-limiting resistors 109 is less than that of the current-limiting resistor 110. Accordingly, the power consumption of the second notification type (via electronic switch 108) is less than that of the first notification type (via melody circuit 106).

As discussed above, the microprocessor 138 is in physical communication with the notification subsystem 142. In particular the microprocessor 138 includes I/O channels that are coupled to the tune select input of the melody circuit 106, and the gate/base input of the electronic switch 108. The notification controller 102 is defined by a set of computer processing instructions which are executed by the microprocessor 138 from the RAM 126. In effect, therefore, the notification controller 102 is coupled to the tune select input of the melody circuit 106, and the gate/base input of the electronic switch 108, through the hardware connections of the microprocessor 138.

The notification controller 102 also comprises a user event notification table that is maintained in one of the program data storage areas 150, 152, 154 and 156 of the flash memory 124. Through the notification controller 102, the user associates a notification event (eg. appointment, to-do item, e-mail, telephone call) with a desired notification type. For instance, through the notification table, the user might configure the notification controller 102 to:

(1) play one time when an e-mail arrives;
(2) play another tune and flash one or more of the LEDs 104 in synchronization with the tune upon receipt of a telephone call, and/or
(3) flash (or turn on) the red LED 104r a predetermined time prior to the commencement of an appointment.

The notification controller 102 is also configured with at least four notification modes. In a first of the notification modes, the notification controller 102 maintains the melody circuit 106 in a low-power or sleep state, and maintains the electronic switch 108 open In this mode, no event notification is provided, and the power consumption of notification subsystem 142 is minimal.

In a second of the notification modes, the notification controller 102 maintains the electronic switch 108 open, enables the melody circuit 106, and disables the lamp driver outputs. In response to the occurrence of a notification event, the notification controller 102 selects the melody that the user associated with the particular notification event, and transmits a command to the melody circuit 106 for playback of the appropriate melody. In response, the melody circuit 106 plays the selected melody over the speaker 134. This response corresponds to sample notification (1), discussed above.

In a third of the notification modes, the notification controller 102 maintains the electronic switch 108 open, enables the melody circuit 106, and enables the lamp driver outputs. In response to the occurrence of a notification event, the notification controller 102 selects the tune that the user associated with the particular notification event, and transmits a command to the melody circuit 106 for playback of the appropriate melody. In response, the melody circuit 106 plays the selected melody over the speaker 134, and flashes the LEDs 104 in synchronization with the selected melody. This response corresponds to sample notification (2), discussed above.

In the second and third notification modes, since the melody circuit 106 is fully operational, the power consumption of the notification subsystem 142 is at its maximum.

In a fourth of the notification modes, the notification controller 102 maintains the melody circuit 106 in the low-power or sleep state. The notification controller 102 periodically opens and closes the electronic switch 108, thereby causing the monochrome LED 104r to flash on or off. Alternately, the notification controller 102 may maintain the electronic switch 108 closed, thereby turning the monochrome LED 104r continuously on.

Since the monochrome LED 104r is on (or periodically on), the power consumption of notification subsystem 142 in this fourth notification mode is greater than that in the first notification mode. However, since the melody circuit 106 is in the low-power or sleep state, the power consumption of notification subsystem 142 in the fourth notification mode is greater than that in the second and third notification modes. As a result, the user can control power consumption of the notification subsystem 142 through the notification mode selected for each desired notification event.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A handheld computing device comprising:
   a notification lamp;
   a melody circuit coupled to the notification lamp for providing a first type notification via the notification lamp;
   an electronic switch coupled to the notification lamp for providing a second type notification via the notification lamp, the second type notification having a power consumption less than that of the first type notification; and
   a notification controller coupled to the melody circuit and the electronic switch for selecting between the notification types.

2. The handheld computing device according to claim 1, wherein the first type notification comprises varying a visual output of the notification lamp in synchronism with a melody.

3. The handheld computing device according to claim 2, wherein the first and second type notifications each comprise a notification of occurrence of an event.

4. The handheld computing device according to claim 3, wherein one of the events comprises an incoming communication.

5. The handheld computing device according to claim 4, wherein the notification controller is configured with a plurality of notification modes,
   in a first of the notification modes, the notification controller maintaining the melody circuit in a low-power state, and maintaining the electronic switch open;
   in a second of the notification modes, the notification controller maintaining the electronic switch open, and enabling the melody circuit.

6. The handheld computing device according to claim 5, wherein in the second notification mode, the notification controller periodically opens and closes the electronic switch.

7. The handheld computing device according to claim 6, wherein the notification lamp comprises a plurality of monochrome lamps, and the melody circuit includes a plurality of lamp driver outputs, each said lamp driver output being coupled to a respective one of the monochrome lamps.

8. The handheld computing device according to claim 7, wherein the monochrome lamps comprise a plurality of differently-coloured monochrome lamps.

9. The handheld computing device according to claim 7, wherein the electronic switch is coupled to one of the monochrome lamps.

10. The handheld computing device according to claim 6, wherein the notification lamp comprises a tri-coloured LED.

11. A notification circuit for a handheld computing device, comprising:
    a notification lamp;
    a melody circuit coupled to the notification lamp for providing a first type notification via the notification lamp; and
    an electronic switch coupled to the notification lamp for providing a second type notification via the notification lamp, the second type notification having a power consumption less than that of the first type notification.

12. The notification circuit according to claim 11, wherein the first type notification comprises varying a visual output of the notification lamp in synchronism with a melody.

13. The notification circuit according to claim 12, wherein the first and second type notifications each comprise a notification of occurrence of an event.

14. The notification circuit according to claim 13, wherein one of the events comprises an incoming communication.

15. The notification circuit according to claim 14, wherein: the notification lamp comprises a plurality of monochrome lamps, and the melody circuit includes a plurality of lamp driver outputs, each said lamp driver output being coupled to a respective one of the monochrome lamps.

16. The notification circuit according to claim 15, wherein the monochrome lamps comprise a plurality of differently-coloured monochrome lamps.

17. The notification circuit according to claim 16, wherein the electronic switch is coupled to one of the monochrome lamps.

18. A handheld computing device comprising:
   a notification lamp comprises a plurality of differently-coloured monochrome lamps;
   a melody circuit coupled to the notification lamp for providing a first type notification, the melody circuit including a plurality of lamp driver outputs, each said lamp driver output being coupled to a respective one of the monochrome lamps;
   an electronic switch coupled to one of the monochrome lamps for providing a second type notification, the second type notification having a power consumption less than that of the first type notification; and
   a notification controller coupled to the melody circuit and the electronic switch for selecting between the notification types, the notification controller being configured with a plurality of notification modes,
   in a first of the notification modes, the notification controller maintaining the melody circuit in a low-power state, and maintaining the electronic switch open;
   in a second of the notification modes, the notification controller maintaining the melody circuit in the low-power state, and closing the electronic switch;
   in a third of the notification modes, the notification controller maintaining the electronic switch open, and enabling the melody circuit.

19. The handheld computing device according to claim 18, wherein in the second notification mode, the notification controller periodically opens and closes the electronic switch.

* * * * *